United States Patent [19]

Furukawa et al.

[11] Patent Number: 4,668,105
[45] Date of Patent: May 26, 1987

[54] BEARINGS FOR ROTARY MACHINES

[75] Inventors: Hiromu Furukawa, Yokohama; Yuji Masumoto, Kokubunji; Shinobu Saito, Chiba, all of Japan

[73] Assignee: Ishikawajima-Harima Jukogyo Kabushiki Kaisha, Japan

[21] Appl. No.: 826,329

[22] Filed: Feb. 5, 1986

[30] Foreign Application Priority Data

Feb. 7, 1985 [JP] Japan .................. 60-15404[U]

[51] Int. Cl.⁴ .................. F16C 27/00; F16C 27/04
[52] U.S. Cl. .................. 384/99; 384/535; 384/581
[58] Field of Search .................. 384/99, 215, 513, 535, 384/536, 537, 539, 569, 538, 581, 582, 584, 585, 450, 517, 613, 504; 308/245, DIG. 15

[56] References Cited

U.S. PATENT DOCUMENTS

| | | | |
|---|---|---|---|
| 2,255,717 | 9/1941 | Tyler | 384/535 X |
| 2,869,941 | 1/1959 | Shoup, Jr. et al. | 384/581 |
| 3,205,024 | 9/1965 | Morley et al. | 384/582 |
| 3,357,757 | 12/1967 | Morley et al. | 384/581 |
| 3,473,853 | 10/1969 | Goss et al. | 384/535 |
| 3,910,651 | 10/1975 | Pearce et al. | 384/99 |
| 4,353,604 | 10/1982 | Dulberger et al. | 384/584 |
| 4,457,667 | 7/1984 | Seibert et al. | 384/99 X |
| 4,496,252 | 1/1985 | Hörler et al. | 384/215 |
| 4,547,083 | 10/1985 | Hörler | 384/581 X |

FOREIGN PATENT DOCUMENTS

| | | |
|---|---|---|
| 72910 | 4/1980 | Japan . |
| 72911 | 6/1980 | Japan . |
| 42721 | 1/1981 | Japan . |
| 109718 | 7/1983 | Japan . |
| 118327 | 12/1983 | Japan . |

Primary Examiner—Stuart S. Levy
Assistant Examiner—Thomas R. Hannon

[57] ABSTRACT

A pin which acts as a spring directly extends through an outer race without use of an outer-race casing and a pin holder and the central portion of the pin supports the outer race. Axial movement of the pin beyond a predetermined range is restricted by snap rings fitted on the both ends of the pin. An oil film is formed between the outer peripheral surface of the outer race and the inner peripheral surface of casings and oil reservoirs are also defined to damp axial movement of the outer race. That is, the pin which acts as a spring directly extends through the outer race of the bearing in parallel with a rotating shaft and the central portion of the pin elastically supports the outer race. The ends of the pin are supported by the casings through the snap rings. A space in which an oil film functioning as an oil film damper is formed is defined by the outer peripheral surface of the outer race and the inner peripheral surface of the casings. Furthermore, the oil reservoirs which act to damp the axial movement of the outer race are defined by the end faces of the outer race and the casings.

4 Claims, 4 Drawing Figures

BEARINGS FOR ROTARY MACHINES

BACKGROUND OF THE INVENTION

The present invention is related to bearings for rotary machines and more particularly bearings of the type having pins as elastic elements and oil film dampers as damping elements. The bearings in accordance with the present invention are particularly adapted for use in high-speed rotary machines such as turbochargers, power recovery turbines, gas turbines, jet engines and steam turbines whose critical speed present problems.

FIG. 3 shows the construction of a typical conventional bearing for high-speed rotary machines. Reference numeral 21 designates a rotating shaft rotating at a high speed; 22, an inner race of a rolling bearing; 23, an outer race; 24, a ball (or a roller in some cases); 25, a casing of the outer race; 26, a pin; 27 and 28, locking nuts for locking the pin 26; 29, a seal ring; 30, a pin holder; and 31, a main body (a casing). The pin 26 is supported as a cantilever at its one end by the outer-race cage 25 while the other end is supported by the holder 30. Therefore the pin 26 receives any thrust load.

As described above, the conventional bearing needs the outer-race casing 25 so that the component parts are increased in number. Furthermore it is difficult to maintain a required accuracy. As a result, the conventional bearing has a low degree of reliability. Moreover, because the pin 26 is supported as a cantilever, an oil film thickness is not constant. Especially in the case of a roller bearing, the axis of the outer race 23 and the axis of the roller are not parallel with each other so that there arises a possibility that the roller contacts partially with the outer race 23. The pin 26 receives any thrust load so that its strength in the axial direction must be considerably high and consequently it is difficult to select a spring constant freely.

The present invention was made to overcome the above and other problems in the conventional bearings. According to the present invention, the number of component parts can be reduced to a minimum; a higher accuracy can be maintained; the overall construction can be made compact in size; and the thickness can be uniformly maintained in the axial direction so that satisfactory damping characteristics can be attained. Furthermore, both the side surfaces of the outer race can be prevented from sticking to its casing.

DETAILED DESCRIPTION OF THE PREFERRED EMBODIMENT

Figure 1:
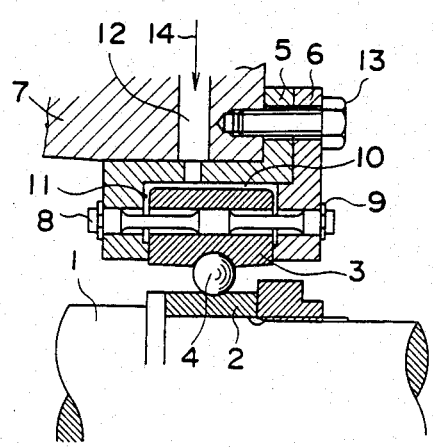
FIG. 1 is a front view, partly in section, of a preferred embodiment of a bearing in accordance with the present invention.

Referring first to FIG. 1 illustrating a preferred embodiment of the present invention, reference numeral 1 designates a rotating shaft; 2, an inner race of a rolling bearing; 3, an outer race; 4, a ball; 5 and 6, casings; 7, a main body; and 8 a pin acting as a spring. The pin 8 is in parallel with the rotating shaft 1 and directly extends through the outer race 3. The pin 8 elastically supports at its center portion the outer race 3. The pin 8 is supported at its one end through a snap ring 9 by one casing 5 while the other end is supported through another snap ring 9 by the other casing 6 such that axial movement of the pin 8 is permitted only within a predetermined range. Reference numeral 10 designates a space in which an oil film is formed as an oil film damper between the outer peripheral surface of the outer race 3 and the inner peripheral surface of the casing 5; 11, oil resevoirs defined by one end surface of the outer race 3 and the casing 5 and by the other end surface of the outer race 3 and the casing 6, respectively; 12, an oil passage to the space 10 and the oil reservoirs 11; and 13, a bolt for securely mounting the casings 5 and 6 on the main body 7.

In the bearing with the construction as shown in FIG. 1, the pin 8 which acts as a spring extends directly through the outer race 3 and in parallel with the axis of the rotating shaft 1 and the central portion of the pin 8 elastically supports the outer race 3.

Axial movement of the pin 8 is permitted within a predetermined range, but axial movement beyond a predetermined range is restricted by the snap rings 9. Thus, displacement of the outer race 3 is in parallel with the axis of the rotating shaft. As indicated by an arrow 14, lubricating oil flows through the oil passage 12 and fills the space 10 defined by the outer peripheral surface of the outer race 3 and the inner peripheral surface of the casing 5. As a result, an oil film which functions as an oil film damper is formed. The lubricating oil further flows into the oil reservoirs 11 so that axial movement of the outer race is damped by the lubricating oil in the oil reservoirs 11 and consequently the end faces of the outer race 3 can be prevented from sticking to its casing 5, 6. More particularly, displacement of the outer race 3 is in parallel with the axis of the rotating shaft so that the space 10 can be maintained constant in the axial direction. As a result, the thickness of the oil film formed in the space 10 will not change in the axial direction so that satisfactory damping characteristics can be attained.

Figure 2:
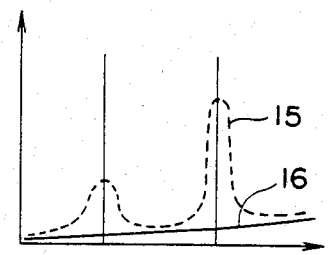
FIG. 2 shows the relationship between a rotational speed of a shaft an amplitude thereof.
Figure 3:
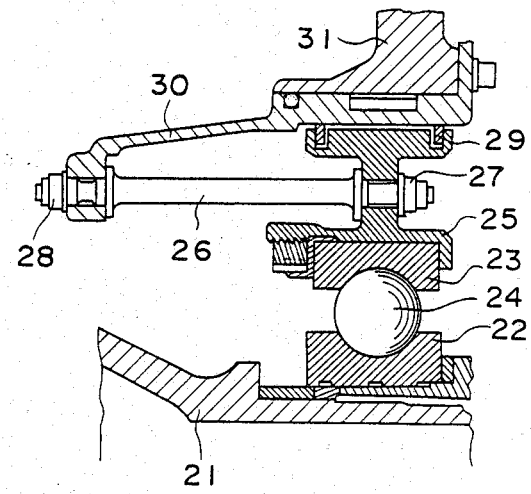
FIG. 3 is a front view, partly in section, of a conventional bearing.
Figure 4:
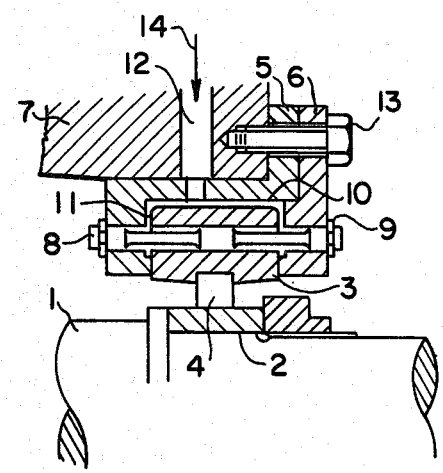
FIG. 4 is a view similar to FIG. 1 except showing a roller bearing.

Referring next to FIG. 2, the rotational speed of the rotating shaft 1 is plotted along the abscissa while the amplitude of the shaft is plotted along the ordinate. The broken-line curve 15 shows the relationship when no spring and damping actions are obtained while the solid-line curve 16 shows the relationship obtained with the bearing as shown in FIG. 1. More particularly, when a rotating shaft is supported by a rolling bearing having no spring and damping actions, its amplitude is remarkably increased at a critical speed as indicated by the broken-line curve 15, but this problem can be substantially overcome by using the bearing as shown in FIG. 1.

So far the present invention has been described in conjuction with a ball bearing, but it is to be understood that the present invention may be equally applied to a roller bearing.

According to the present invention, use of an outer-race casing and a pin holder is eliminated. The pin which acts as a spring directly extends through the outer race of the bearing and its center portion elastically supports the outer race. Axial movement of the pin beyond a predetermined range is restricted by the snap rings fitted on the both ends of the pin. As a result, the number of component parts can be reduced; a high accuracy can be maintained; and the bearing can be made compact in size. In addition, as compared with the bearings in which screws are used as pins, production and assembly of the bearings in accordance with the present invention can be much facilitated and deformations of the bearings when assembled can be eliminated. Furthermore, the bearing in accordance with the present invention does not receive a thrust load so that it becomes not necessary to take into consideration the axial strength of the pin so that a suitable spring constant can be selected freely. Moreover, according to the present invention, the pin is disposed in parallel with the axis of the rotating shaft and is supported at its both ends by the casings through the snap rings so that the displacement of the outer race is in parallel with the axis of the rotating shaft. As a consequence, the thickness of the oil film which is defined by the outer peripheral surface of the outer race and the inner peripheral surface of the casing and functions as an oil film damper will not vary in the axial direction so that satisfactory damping characteristics can be attained. Furthermore, the oil reservoirs are defined by the end faces of the outer race and the casings, providing the damping action to the axial movement of the outer race, whereby the end faces of the outer race can be prevented from sticking to its casing.

What is claimed is:

1. A bearing for a rotary machine comprising an outer race of the bearing fitted over a rotatable shaft, a casing means fitted over the outer race, a support, said casing means being securely attached to the support, a pin extending through said casing means and said outer race in parallel with an axis of said rotatable shaft such that both ends of said pin are supported by said casing means and said pin elastically supports said outer race, and a space defined by an outer peripheral surface of said outer race and said casting means, lubricating oil being supplied into said space to form an oil film which functions as an oil damper.

2. a bearing according to claim 1 wherein said both ends of said pin are fitted with snap rings for support by said casing means, oil reservoirs in communication with said space being defined by end faces of said outer race and said casing means.

3. A bearing according to claim 1 wherein rolling bodies of the bearing are balls.

4. A bearing according to claim 1 wherein rolling bodies of the bearing are rollers.

* * * * *